(12) United States Patent
Mizuno et al.

(10) Patent No.: US 10,933,862 B2
(45) Date of Patent: Mar. 2, 2021

(54) VEHICLE CONTROL SYSTEM

(71) Applicant: TOYOTA JIDOSHA KABUSHIKI KAISHA, Toyota (JP)

(72) Inventors: Junya Mizuno, Sunto-gun (JP); Akira Takeichi, Susono (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 16/166,553

(22) Filed: Oct. 22, 2018

(65) Prior Publication Data

US 2019/0118796 A1 Apr. 25, 2019

(30) Foreign Application Priority Data

Oct. 20, 2017 (JP) ............................ JP2017-203574

(51) Int. Cl.
| | |
|---|---|
| *B60W 20/20* | (2016.01) |
| *B60K 6/442* | (2007.10) |
| *B60W 10/06* | (2006.01) |
| *B60W 10/08* | (2006.01) |
| *B60W 50/08* | (2020.01) |
| *B60W 20/40* | (2016.01) |
| *B60W 10/115* | (2012.01) |
| *B60W 10/02* | (2006.01) |

(52) U.S. Cl.
CPC .............. *B60W 20/20* (2013.01); *B60K 6/442* (2013.01); *B60W 10/06* (2013.01); *B60W 10/08* (2013.01); *B60W 10/115* (2013.01); *B60W 20/40* (2013.01); *B60W 50/082* (2013.01); *B60W 10/02* (2013.01); *B60W 2540/10* (2013.01); *B60W 2710/021* (2013.01)

(58) Field of Classification Search
CPC ...... B60W 20/20; B60W 20/40; B60W 10/06; B60W 10/08; B60W 50/082; B60W 2540/10; B60W 2710/021; B60K 6/442
See application file for complete search history.

(56) References Cited

U.S. PATENT DOCUMENTS

| | | | |
|---|---|---|---|
| 2007/0056783 A1* | 3/2007 | Joe ......................... | B60L 58/12 180/65.265 |
| 2008/0119975 A1* | 5/2008 | Yamazaki ................ | B60K 6/48 701/22 |
| 2008/0228363 A1* | 9/2008 | Kouno .................... | B60K 6/48 701/54 |
| 2011/0098152 A1* | 4/2011 | Sah ........................ | B60K 6/365 477/86 |
| 2013/0218394 A1 | 8/2013 | Kanayama et al. | |

FOREIGN PATENT DOCUMENTS

WO 2012/059996 A1 5/2012

* cited by examiner

*Primary Examiner* — Huan Le
(74) *Attorney, Agent, or Firm* — Oliff PLC

(57) ABSTRACT

A vehicle control system configured to promptly shift a gear stage of a transmission during startup of an engine while reducing shocks. An engine is started by a first motor when shifting from an electric vehicle mode to a parallel hybrid vehicle mode. A controller is configured to establish a target stage via an interim stage if a shifting operation of a transmission to directly establish the target stage is expected to take longer time than a shifting operation of the transmission to establish the target stage via other stage.

14 Claims, 6 Drawing Sheets

| | C1 | C2 | C3 | C4 | B1 | B2 |
|---|---|---|---|---|---|---|
| 1st | ○ | ○ | | | | ○ |
| 2nd | ○ | | | | ○ | ○ |
| 3rd | | ○ | | | ○ | ○ |
| 4th | | | | ○ | ○ | ○ |
| 5th | | ○ | | ○ | ○ | |
| 6th | ○ | | | ○ | ○ | |
| 7th | ○ | | ○ | ○ | | |
| 8th | | | ○ | ○ | ○ | |
| 9th | ○ | | ○ | | ○ | |
| 10th | | ○ | ○ | | ○ | |
| Rev | | ○ | ○ | | | ○ |

…

VEHICLE CONTROL SYSTEM

CROSS-REFERENCE TO RELATED APPLICATIONS

The present disclosure claims the benefit of Japanese Patent Application No. 2017-203574 filed on Oct. 20, 2017 with the Japanese Patent Office, the disclosures of which are incorporated herein by reference in its entirety.

BACKGROUND

Field of the Disclosure

Embodiments of the present disclosure relate to the art of a control system for a vehicle configured to start an engine when propelling the vehicle while bringing the transmission into a neutral state.

Discussion of the Related Art

PCT international publication No. WO 2012/059996 describes a vehicle hybrid drive device comprising a first motor coupled to an engine, a connection/disconnection device capable of connecting/disconnecting the engine and the first motor to/from wheels, and a second motor disposed in a manner enabling transmission of drive power to the wheels. The drive device taught by WO 2012/059996 is adapted to select an operating mode from an electric vehicle mode and a parallel mode. In the electric vehicle mode, the vehicle is powered by the second motor while stopping the engine and disconnecting the connection/disconnection device. In the parallel mode, the vehicle is powered by the engine and at least one of the first motor and the second motor while disconnecting the connection/disconnection device.

In the conventional art, attempts have been made to increase number of gear stages of an automatic transmission having a plurality of engagement devices for the purpose of saving fuel. If the engagement devices of such transmission are engaged simultaneously, an inertia torque would be changed by changes in speeds of the engine and rotary members of the transmission. Consequently, in the engagement device, a speed of an input rotary member may be raised higher than a speed of an output rotary member to change a drive torque significantly, and an engagement shock may be caused by such change in the drive torque.

According to the teaching of WO 2012/059996, startup of the engine is commenced during propulsion in the electric vehicle mode upon satisfaction of a condition to shift the operating mode to the parallel mode in accordance with an operation of the accelerator. When starting the engine in response to the operation of the accelerator, a gear stage of the transmission has to be shifted promptly to a target stage that is determined based at least on a vehicle speed at a point when the engine is started. As a result of thus shifting the gear stage of the transmission during the startup of the engine, the drive torque and the inertia torque would be changed significantly. In this situation, the driver may feel a shock of an output shaft resulting from such change in the torque. For example, such shift shock may be reduced by moderately increasing hydraulic pressure applied to the last engagement device to be engaged to shift the gear stage. In this case, however, a length of time to shift the gear stage to the target stage would be increased.

SUMMARY

Aspects of an embodiment of the present disclosure have been conceived noting the foregoing technical problems, and it is therefore an object of the present disclosure to provide a vehicle control system configured to promptly shift a gear stage of a transmission during startup of an engine while reducing shocks.

The embodiments of the present disclosure relate to a vehicle control system, comprising: an engine that generates a driving force to propel a vehicle; a transmission that changes the driving force and outputs the changed driving force; and a controller that controls the engine and the transmission. In order to achieve the above-explained objective, the controller is configured to: determine a satisfaction of a condition to start the engine during propulsion while stopping the engine and bringing the transmission into a neutral condition; set a target stage to be established by the transmission upon satisfaction of the condition to start the engine; determine whether a shifting operation of the transmission to directly establish the target stage takes longer time than a shifting operation of the transmission to establish the target stage via other stage; set an interim stage that can be established by the transmission in shorter period of time than the target stage, and shift the gear stage from the interim stage to the target stage, in a case that the shifting operation of the transmission to directly establish the target stage is expected to take longer time than the shifting operation of the transmission to establish the target stage via other stage; and establish the target stage directly in a case that that the shifting operation of the transmission to directly establish the target stage is expected not to take longer time than the shifting operation of the transmission to establish the target stage via other stage.

In a non-limiting embodiment, the controller may be further configured to determine that the shifting operation of the transmission to directly establish the target stage takes longer time than the shifting operation of the transmission to establish the target stage via other stage, if an amount of change in an angular acceleration of an input shaft of the transmission to be caused by directly establishing the target stage is smaller than the threshold value.

In a non-limiting embodiment, the controller may be further configured to determine that the shifting operation of the transmission to directly establish the target stage takes longer time than the shifting operation of the transmission to establish the target stage via other stage, if an amount of change in a torque of the output shaft of the transmission to be caused by directly establishing the target stage is greater than the threshold value.

In a non-limiting embodiment, the controller may be further configured to set the interim stage to a gear stage one stage lower than the target stage or one stage higher than the target stage.

In a non-limiting embodiment, the controller may be further configured to set the interim stage to the gear stage one stage lower than the target stage if the engine is required to be started to accelerate the vehicle in a specific condition.

In a non-limiting embodiment, the vehicle control system may further comprise a first motor that is connected to the engine, and a second motor that applies a driving force to a wheel. The gear stage may be established in the transmission by engaging any two or more engagement devices, and the transmission is brought into a neutral stage to interrupt power transmission by disengaging the engagement devices. An operating mode of the vehicle may be selected from an electric vehicle mode in which the engagement devices are disengaged and the vehicle is powered by the second motor while stopping the engine, and a parallel hybrid vehicle mode in which the vehicle is powered by the engine in a predetermined gear stage. In addition, the controller may be further configured to start the engine by the first motor upon satisfaction of a condition to shift the operating mode from the electric vehicle mode to the parallel hybrid vehicle mode.

Thus, according to the embodiment of the present disclosure, if the shifting operation of the transmission to directly establish the target stage is expected to take longer time than the shifting operation of the transmission to establish the target stage via other stage, the interim stage is set temporarily and then the gear stage is shifted to the target stage. By contrast, if the shifting operation of the transmission to directly establish the target stage is expected not to take longer time than the shifting operation of the transmission to establish the target stage via other stage, the target stage is established directly. According to the embodiment of the present disclosure, therefore, the target stage can be established promptly while reducing a shock when shifting the operating mode to the electric vehicle mode to the parallel hybrid vehicle mode.

Moreover, it is possible to determine whether the shifting operation of the transmission to directly establish the target stage takes longer time than the shifting operation of the transmission to establish the target stage via other stage based on a change in an angular acceleration of the input shaft of the transmission.

It is also possible to determine whether the shifting operation of the transmission to directly establish the target stage takes longer time than the shifting operation of the transmission to establish the target stage via other stage based on a change in a torque of the output shaft of the transmission.

Further, in the case of setting the interim stage to the gear stage one stage lower or higher than the target stage, the gear stage may be shifted promptly from the interim stage to the target stage by merely disengaging one of the engagement devices while engaging other one of the engagement devices.

Furthermore, in the case of setting the interim stage to the gear stage one stage lower than the target stage, an acceleration response of the vehicle can be enhanced.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
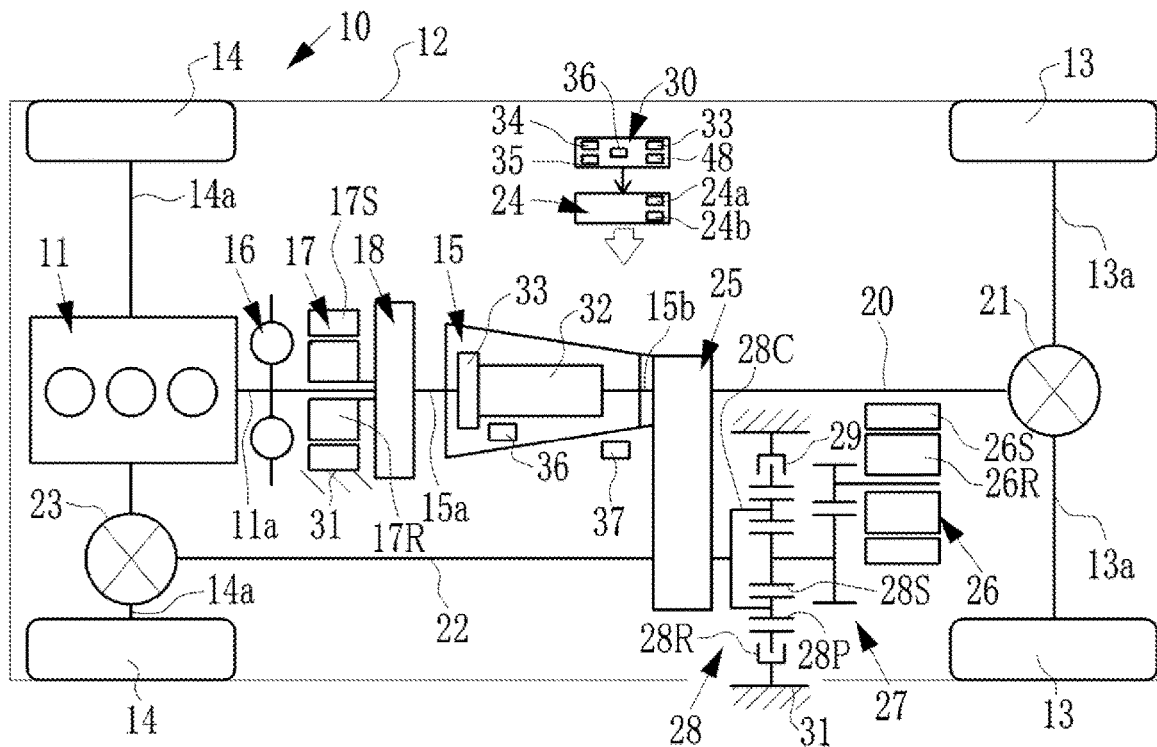
FIG. 1 is a schematic illustration showing a structure of a hybrid vehicle to which the control system according to the embodiment of the present disclosure is applied.

Embodiments of the present disclosure will now be explained with reference to the accompanying drawings. Referring now to FIG. 1, there is shown a structure of a hybrid vehicle 10 (as will be simply called the "vehicle" hereinafter) as a four-wheel drive vehicle to which a control system according the embodiment of the present disclosure is applied. The vehicle 10 is an FR (front-engine/rear-drive) layout vehicle in which an engine 11 is arranged in a front section of a vehicle body 12, and a power of the engine 11 is delivered to a pair of rear wheels 13. Specifically, the engine 11 is disposed between front wheels 14 in such a manner that an output shaft (i.e., a crankshaft) extends in a longitudinal direction of the vehicle 10.

An automatic transmission (as will be simply called the "transmission" hereinafter) 15 is disposed downstream of the engine 11 so that an output power of the engine 11 is delivered from an output shaft 11a of the engine 11 to an input shaft 15a of the transmission. The transmission unit 15 is adapted to change a speed ratio between an input speed and an output speed arbitrarily, and for example, a geared transmission in which a speed ratio is changed by shifting a gear stage may be adopted as the transmission unit 15. In the vehicle 10, therefore, an input torque to the transmission unit 15 is delivered to the rear wheel 13 while being multiplied according to the gear stage established in the transmission unit 15. The gear stage of the transmission unit 15 is shifted among a plurality of stages by manipulating engagement devices of the transmission unit 15. The transmission unit 15 may be brought into a neutral stage by disengaging all of the engagement devices of the transmission unit 15.

As illustrated in FIG. 1, specifically, the transmission unit 15 is arranged coaxially with the output shaft 11a of the engine 11. A damper device 16 for absorbing pulsation of an engine torque, and a first motor-generator (as will be simply called the "first motor" hereinafter) 17 are interposed between the engine 11 and the transmission unit 15. The damper device 16 may be omitted according to need. The first motor 17 is operated mainly as a motor to generate a torque for propelling the vehicle 10 and for motoring the engine 11, and also operated as a generator to generate electricity in e.g., the below-mentioned series hybrid vehicle mode. In the first motor 17, a stator 17S is fixed to a predetermined stationary member 31, and a rotor 17R is joined to the output shaft 11a of the engine 11 of the output shaft 15a of the transmission unit 15 through a power split mechanism 18.

A rear propeller shaft 20 is connected to axles 13a of the rear wheels 13 through a rear differential gear unit 21 as a final reduction unit. Likewise, a front propeller shaft 22 is connected to axles 14a of the front wheels 14 through a front differential gear unit 23 as a final reduction unit.

Specifically, the rear propeller shaft 20 extends in the longitudinal direction at a substantially width center of the vehicle body 12, and the front propeller shaft 22 also extends substantially parallel to the rear propeller shaft 20.

A transfer 25 is disposed on an output side of the transmission unit 15 to distribute output power of the engine 1 or torque of an output shaft 15b of the transmission 5 to the front wheels 4 and the rear wheels 3. The rear propeller shaft 20 is connected to an output member (not shown) of the transfer 25 to deliver torque to the rear wheels 13, and the front propeller shaft 13 is connected to another output member (not shown) of the transfer 25 to deliver torque to the front wheels 14.

For example, a wrapping transmission using a chain or belt, a gear unit and so on may be used as the transfer 25. In addition, a full-time four-wheel drive mechanism including a differential mechanism that allows a differential rotation between the front wheels 14 and the rear wheels 13 and a restriction mechanism that restricts the differential rotation between the front wheels 14 and the rear wheels 13, and a part-time four-wheel drive mechanism that selectively interrupt torque transmission to the front wheels 14 may also be used as the transfer 25.

A second motor-generator (as will be simply called the "second motor" hereinafter) 26 is connected to the rear side of the transfer 25 through a speed reducing mechanism 27 so that an output torque of the second motor 26 is delivered to the front propeller shaft 22. The second motor 26 is used not only to generate a drive torque to propel the vehicle 10 but also to regenerate electricity when the vehicle 10 decelerates. For example, a permanent magnet synchronous motor may be used as the second motor 26. The second motor 26 may also be connected directly to the front propeller shaft 22 given that the speed reducing mechanism 27 is not arranged in the vehicle 10.

The speed reducing mechanism 27 includes a planetary gear unit 28 and an engagement device 29. The planetary gear unit 28 comprises: a sun gear 28S as an input element to which torque of the second motor 26 is applied; a carrier 28C as an output element which delivers the torque to the transfer 25; a ring gear 28R as a reaction element which establishes a reaction torque to multiply the torque to be delivered to the carrier 28C; and a plurality of pinion gears 28P interposed between the sun gear 28S and the ring gear 28R while being supported in a rotatable manner by the carrier 28C. The ring gear 28R is connected to a predetermined stationary member 31 by engaging the engagement device 29 thereby stopping a rotation of the ring gear 28R, and the ring gear 28R is allowed to rotate by disengaging the engagement device 29. When the engagement device 29 is in engagement, the stationary member 31 establishes a reaction force against a torque of the ring gear 28R so that the torque is transmitted from the carrier 28C to the transfer 25. By contrast, when the engagement device 29 is in disengagement, the ring gear 28R is allowed to rotate freely so that torque transmission between the rotor 26R and the transfer 25 is interrupted. That is, when the engagement device 29 is disengaged, torque transmission between the rotor 26R and the rear wheels 13, and between the rotor 26R and the front wheels 14 is interrupted respectively. A stator 26S of the second motor 26 is fixed to a predetermined stationary member 31.

The power split mechanism 18 is a single-pinion planetary gear unit including three rotary elements. In the power split mechanism 18, a sun gear as a reaction element is connected to a rotor of the first motor 17, a carrier as an output element is connected to the output shaft 11a, and a ring gear as an input element is connected to the input shaft 15a. In the vehicle 10, an output torque of the engine 11 is distributed to the first motor 17 and the transmission unit 15 so that the first motor 17 is rotated by the torque of the engine 11 to serve as a generator while applying a reaction torque to the sun gear. Consequently, the output torque of the engine 11 is outputted from the carrier. A rotational speed of the engine 11 is controlled by the first motor 17 in an optimally fuel efficient manner. To the transmission unit 15, a synthesized torque of the output torque of the engine 11 and the reaction torque of the first motor 17 is applied.

In the vehicle 10, the power split mechanism 18 may be omitted as necessary. In this case, the rotor 17R of the first motor 17 may be connected directly to the output shaft 11a or the input shaft 15a. Further, the first motor 17 may also be omitted as necessary.

An electronic control unit (to be abbreviated as the "ECU" hereinafter) 30 as a controller controls the engine 11, the power split mechanism 18, the transmission unit 15 and so on. The ECU 30 comprises a motor control unit 24 including a battery 24a and an inverter 24b, and each of the first motor 17 and the second motor 26 is controlled individually by the motor control unit 24 to selectively serve as a motor and a generator.

The ECU 30 is composed mainly of a microcomputer, and is configured to execute a calculation based on incident data as well as data installed in advance, and transmits a calculation result in the form of command signal. To this end, for example, the ECU 30 receives data about; a vehicle speed; an accelerator position representing a required driving force; a depression of a brake pedal or a pedal force applied to the brake pedal; a state of charge (to be abbreviated as the "SOC" hereinafter) level of the battery 24a; speeds of the front wheel 14 and the rear wheel 13; a temperature of coolant of the engine 11 and so on.

The ECU 30 comprises a mode selector 33, a shifting time determiner 34, and a gear stage determiner 35. An operating mode of the vehicle 10 may be selected from an electric vehicle mode (to be abbreviated as the "EV mode" hereinafter) and a hybrid vehicle mode (to be abbreviated as the "HV mode" hereinafter). The HV mode may be further selected from a series hybrid mode (to be abbreviated as the "series HV mode" hereinafter) and a parallel hybrid mode (to be abbreviated as the "parallel HV mode" hereinafter).

Specifically, the mode selector 33 selects the operating mode with reference to a map for determining the operating mode based on a required driving force and a vehicle speed. Optionally, the operating mode may also be selected taking account of a temperature of the engine 11, an SOC level of the battery 24a, and a required braking force.

Basically, the EV mode is selected when an SOC level of the battery 24a is sufficiently high, a required driving force is small, and a vehicle speed is low. On the other hand, the series HV mode and the parallel HV mode are selected when a required driving force is large, and a vehicle speed is high. The required driving force includes a required force during propulsion in an autonomous cruise mode. In addition, during propulsion in the EV mode, the operating mode may be shifted to the parallel HV mode when it in necessary to generate an engine braking force.

In the EV mode, the vehicle 10 is powered by the second motor 26 while stopping the engine 11 and the first motor 17, and the transmission unit 15 is brought into the neutral stage so as not to rotate the engine 11 passively. In the EV mode, specifically, an ignition of the engine 11 and a fuel supply to the engine 11 are stopped. Since the vehicle 1 is provided with the transfer 25, the vehicle 10 is allowed to propel in a four-wheel mode even in the EV mode.

In the HV mode, the vehicle 11 is powered at least by the engine 11, and may also be powered by the second motor 26 operated as a motor by the electricity generated by the first motor 17. In the parallel HV mode, the vehicle 11 is powered by the engine 11, the first motor 17, and the second motor 26.

When a condition to shift the operating mode from the EV mode to the parallel HV mode or the series HV mode is satisfied, the engine 11 is cranked by the first motor 17 to be started. In other words, a motoring of the engine 11 is executed by the first motor 17. For example, the engine 11 is started by the first motor 17 when an SOC level of the battery 24a falls below a threshold level, a temperature of the engine 11 falls below a threshold level, an a depression of the accelerator pedal is increased (that is, a required driving force is increased), and an engine braking force is demanded. In order to startup the engine 11, the first motor 17 is operated as a motor.

The engine 11 may also be started by a starter (not shown) instead of the first motor 17. In a case of using the starter to startup the engine 11, an output torque of a starter motor is delivered to the output shaft 11a of the engine 11 through a starter pinion by engaging the starter pinion with a gear formed around a flywheel disposed on the output shaft 11a.

In the series HV mode, the first motor 17 is driven as a generator by the output torque of the engine 11, and the second motor 26 is operated as a motor by the electricity generated by the first motor 17 to propel the vehicle 10. Thus, in the series HV mode, the engine 11 is activated and the first motor 17 is operated as a generator, and the transmission unit 15 is brought into the neutral stage in order not to transmit the output torque of the engine 11 to the rear wheels 13. That is, in the series HV mode, only the output torque of the second motor 26 is delivered to the front wheels 14 and the rear wheels 13.

In the parallel HV mode, the vehicle 10 is powered by the engine 11, the first motor 17, and the second motor 26. Specifically, in the parallel HV mode, the first motor 17 is also operated as a motor by the electricity supplied from the battery 24a, and the transmission unit 15 is controlled to establish a desired gear stage so as to transmit the output torque of the engine 11 to the rear wheels 13. Output torques of the engine 11 and the first motor 17 are distributed to the front wheels 13 and the rear wheels 14 through the transmission unit 15 and the transfer 25. For these reasons, the driving force to propel the vehicle 10 is increased to enhance a driving performance of the vehicle 10 especially on a rough road.

ECU 30 is configured to select a shifting mode of the operating mode from the EV mode to the parallel HV mode from a first shifting mode and a second shifting mode. Specifically, in the first shifting mode, the operating mode is shifted from the EV mode to the parallel HV mode by cranking the engine 11 by the first motor 17 while setting a target stage in the transmission unit 15. On the other hand, in the second shifting mode, the operating mode is shifted from the EV mode to the parallel HV mode by cranking the engine 11 by the first motor 17 while setting a target stage in the transmission unit 15 via an interim stage in which a speed ratio is different from a speed ratio in the target stage.

In order to select the shifting mode of the operating mode from the first shifting mode and the second shifting mode, the shifting time determiner 34 determines whether a shifting operation of the transmission unit 15 to directly establish the target stage takes longer time than a shifting operation of the transmission unit 15 to establish the target stage via other stage. Such determination may be made based at least on one of a change amount in a torque of the output shaft 15b and a change amount in an angular acceleration of the input shaft 15a. Specifically, when shifting the operating mode from the EV mode to the parallel HV mode in response to an accelerating operation executed by the driver or by an autonomous cruise control, such determination is made based on whether a change amount in an angular acceleration of the input shaft 15a is smaller than a threshold value. Otherwise, when shifting the operating mode from the EV mode to the parallel HV mode due to reduction in an SOC level of the battery 24 below the threshold level, or in order to decelerate the vehicle 10 by an engine braking force, such determination is made based on whether a change amount in a torque of the output shaft 15b is greater than a threshold value.

A shock caused by a change in the drive torque may be determined based on a change in a torque of the output shaft 15b, and an acceleration response may be determined based on a change in an angular acceleration of the input shaft 15a. Therefore, the shifting time determiner 34 determines that the shifting operation of the transmission unit 15 to directly establish the target stage will take longer time than the shifting operation of the transmission unit 15 to establish the target stage via other stage, if an amount of change in a torque of the output shaft 15b to be caused by directly establishing the target stage is greater than the threshold value. Otherwise, the shifting time determiner 34 also determines that the shifting operation of the transmission unit 15 to directly establish the target stage will take longer time than the shifting operation of the transmission unit 15 to establish the target stage via other stage, if an amount of change in an angular acceleration of the input shaft 15a to be caused by directly establishing the target stage is smaller than the threshold value.

An amount of change in the torque of the output shaft 15b corresponds to an amount of change in an output torque per unit of time, therefore, a shift shock caused when starting the engine 11 may be determined based on time instead of the amount of change in the torque of the output shaft 15b. Similarly, an amount of change in the angular acceleration of the input shaft 15a corresponds to an amount of change in a speed, therefore, an acceleration response may be determined based on time instead of the amount of change in the angular acceleration of the input shaft 15a. According to the embodiment of the present disclosure, a required time to change a speed ratio is determined based on whether a required time to shift the gear stage directly to the target stage takes longer time than a required time to shift the gear stage to the target stage via other stage.

The gear stage determiner 35 determines an interim stage of the transmission unit 15 that can be established in shorter period of time than the target stage, if the required time to directly establish the target stage will take longer time than the required time to establish the target stage via other stage. Otherwise, if the required time to directly establish the target stage will not take longer time than the required time to establish the target stage via other stages, the gear stage determiner 35 set a required gear stage determined based e.g., on a depression of the accelerator pedal and a vehicle seed as the target stage. Accordingly, if the required time to directly establish the target stage will take longer time than the required time to establish the target stage via other stage, the interim stage is established in the transmission unit 15 first, and then the gear stage is shifted to the target stage. By contrast, if the required time to directly establish the target stage will not take longer time than the required time to establish the target stage via other stage, the target stage is established directly in the transmission unit 15.

For example, the gear stage determiner 35 sets the interim stage to the gear stage one stage lower than the target stage, if the engine 11 is required to be started to accelerate the vehicle 10 in a specific condition. Otherwise, if the engine 11 is required to be started in a condition other than the specific condition, the gear stage determiner 35 sets the interim stage to the gear stage one stage higher than the target stage. For instance, the specific condition may be determined based on a fact that the accelerator pedal is depressed at a speed higher than a predetermined speed from a point just before the engine 11 is required to be started (i.e., a change rate of depression per unit of time).

The specific condition includes a condition in which the vehicle 10 approaches an upward slope or a corner on an upward slope. Information about such road condition may be obtained through a navigation system or the like. In addition, the specific condition further includes a condition in which a road ahead the vehicle 10 is congested, and a condition in which a traffic light ahead the vehicle 10 is red. Information about such road condition and behavior of preceding cars may be obtained from an external server through a communication means.

Such determination of the specific condition may be omitted. In this case, the interim stage may be set to the gear stage one stage higher or lower than the target stage depending on a vehicle speed at a point when the engine 11 is required to be started. For example, if the vehicle speed is higher than a predetermined speed set at each gear stage, the interim stage is set to the gear stage one stage higher than the target stage. Otherwise, if the vehicle speed is lower than the predetermined speed set at each gear stage, the interim stage is set to the gear stage one stage lower than the target stage.

Figure 2:
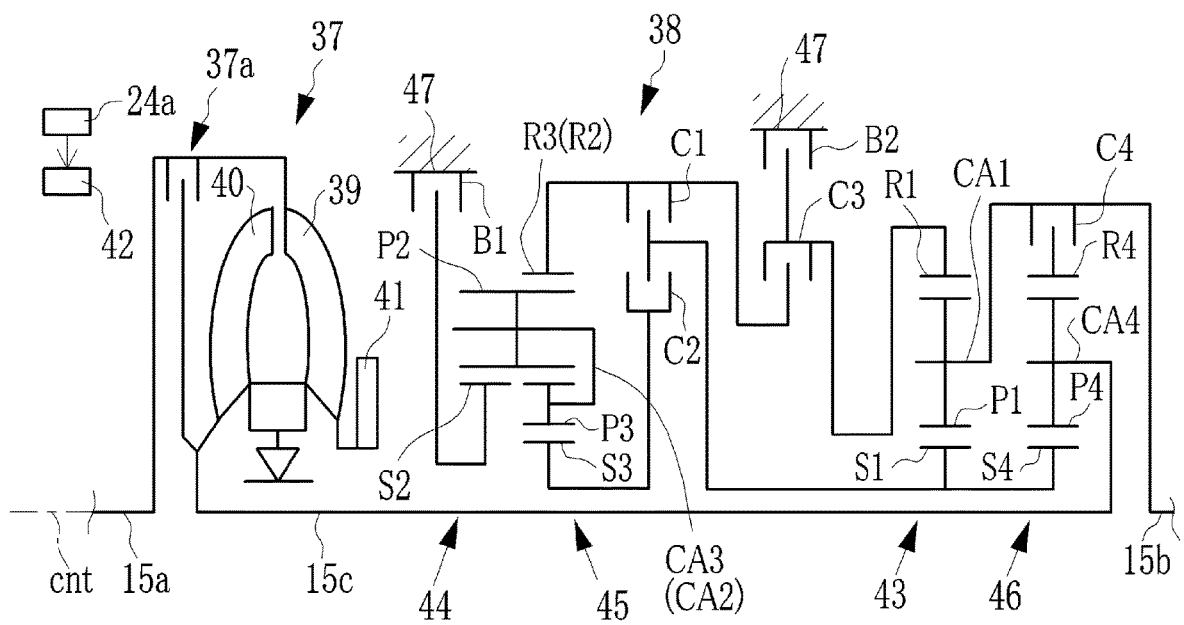
FIG. 2 is a skeleton diagram schematically showing a structure of a transmission of the hybrid vehicle shown in FIG. 1.

FIG. 2 shows a structure of the transmission unit 15 in more detail. As illustrated in FIG. 2, the transmission unit 15 includes a torque converter 37, and a transmission 38. The engine 11 and the torque converter 37 are arranged coaxially with the input shaft 15a. Although the torque converter 37 and the transmission 38 respectively have a symmetrical structure across the input shaft 15a, lower halves of the torque converter 37 and the transmission 38 are omitted in FIG. 2 for the sake of illustration. Instead, the torque converter 37 may also be disposed between the engine 11 and the transmission unit 15, or between the damper device 16 and the transmission unit 15. The torque converter 37 may be omitted as necessary.

The torque converter 37 comprises a pump impeller 39 connected to the input shaft 15a, and a turbine runner 40 connected to a second input shaft 15c of the transmission unit 15, and a lockup clutch 37a. The torque converter 37 is adapted to hydraulically transmit output torque of the engine 11 to the transmission unit 15. When the lockup clutch 37a is engaged, the torque transmitted from the input shaft 15a is transmitted directly to the second input shaft 15c. The pump impeller 39 is also connected to a mechanical oil pump 41 that discharges operating oil to be delivered to each engagement device C1, C2, C3, B1, and B2. Shifting operation of the transmission unit 15 is executed by manipulating the engagement devices C1, C2, C3, B1, and B2. The vehicle 10 is further provided with an electric oil pump 42 that is driven to deliver the oil to the engagement devices C1, C2, C3, B1, and B2 to execute a shifting operation in the transmission unit 15 when required.

The transmission 38 comprises a single-pinion first planetary gear set 43, a Ravigneaux second planetary gear set 44, a double-pinion third planetary gear set 45, and a single-pinion fourth planetary gear set 46. Those planetary gear sets 43, 44, 45, and 46 are arranged coaxially with the input shaft 15a. Torque is delivered to the transmission 38 from the second input shaft 15c, and further transmitted from the output shaft 15b while being changed by the transmission 38.

Each of the first planetary gear set 43, the second planetary gear set 44, the third planetary gear set 45, and the fourth planetary gear set 46 individually comprises a sun gear (S1, S2, S3, S4), a ring gear (R1, R2, R3, R4), and a carrier (CA1, CA2, CA3, CA4). Each of the sun gears (S1, S2, S3, S4) is individually fitted onto the second input shaft 15c in a rotatable manner, and each of the ring gears (R1, R2, R3, R4) is arranged concentrically with the sun gears (S1, S2, S3, S4) respectively in a rotatable manner. A plurality of pinion gears (P1, P2, P3, P4) are interposed between each of the sun gears (S1, S2, S3, S4) and the ring gears (R1, R2, R3, R4) while being supported by the carriers (CA1, CA2, CA3, CA4) in a rotatable manner.

Specifically, the engagement devices of the transmission unit 15 include a first clutch C1, a second clutch C2, a third clutch C3, a first brake B1, and a second brake B2. For example, a wet-type multiple-plate frictional engagement device that is activated by a hydraulic actuator may be adopted as each of the engagement devices C1, C2, C3, B1, and B2 respectively.

The first clutch C1, the second clutch C2, and the third clutch C3 are engaged to connect predetermined rotary elements of the planetary gear sets 43, 44, 45, 46 to establish a desired gear stage in the transmission unit 15. On the other hand, the first brake B1 and the second brake B2 are engaged to engage predetermined rotary elements of the planetary gear sets 43, 44, 45, 46 with a predetermined stationary member 47. Engagement states of the first clutch C1, the second clutch C2, the third clutch C3, the first brake B1, and the second brake B2 in each gear stage are shown in FIG. 3.

Figures 3, 4:
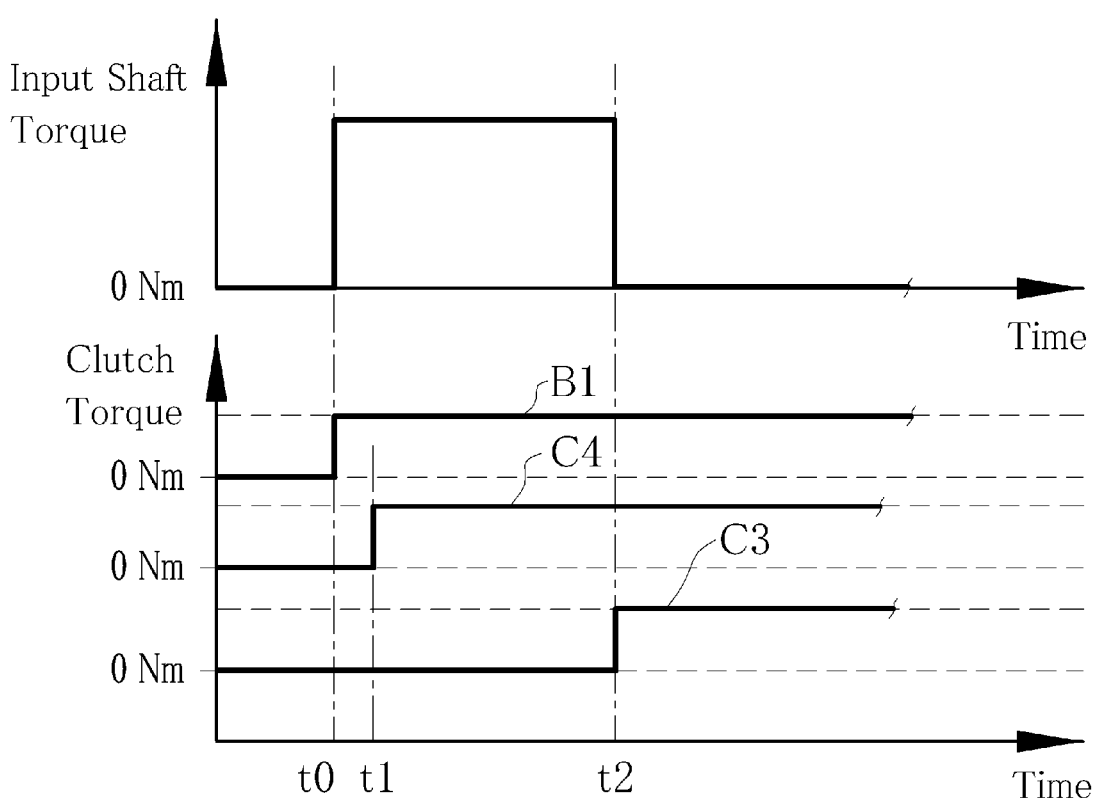
FIG. 3 is a table showing engagement states of engagement devices in each gear stage.
FIG. 4 is a time chart indicating a temporal change in an input torque to an input shaft of the transmission when motoring the engine, and temporal changes in torques applied to engagement devices to be engaged to establish a target stage.

As shown in FIG. 3, a forward stage of the transmission unit 15 may be selected from the 1st stage to the 10th stage, and a reverse stage (referred to as "Rev" in FIG. 3) is also available. In the table shown in FIG. 3, "O" represents engagement of the engagement device. As can be seen from FIG. 3, each of the gear stages of the transmission unit 15 is established by engaging any three of the engagement devices of the transmission unit 15. However, the transmission unit 15 may be modified to set the gear stage by engaging four or more engagement devices.

The transmission unit 15 further comprises a hydraulic control unit (not shown) including a plurality of linear solenoid valves to actuate the engagement devices. A torque transmitting capacity of each of the engagement devices is changed by selectively supplying the operating oil to the engagement device through the linear solenoid valve. Specifically, a torque transmitting capacity of each of the engagement devices is changed continuously depending on a pressure of the operating oil supplied thereto, and the engagement devices is engaged completely by increasing pressure of the operating oil supplied thereto to an engagement pressure. By contrast, the engagement device is released or disengaged by stopping oil supply thereto. A definition of the engagement pressure is a hydraulic pressure by which a torque transmitting capacity of the engagement device is increased to a level possible to transmit the drive torque completely, and the engagement pressure is calculated by multiplying a theoretical value of the engagement pressure by a predetermined safety rate.

When the engine 11 is required to be started, the target stage of the transmission unit 15 is determined depending on a depression of the accelerator pedal (i.e., an opening degree of the accelerator), a vehicle speed and so on, and the engagement devices are manipulated in such a manner as to establish the target stage in the transmission unit 15. A speed ratio γ of each of the gear stages of the transmission unit 15 can be expresses as γ=input speed Nin/output speed Nout.

The speed ratio γ of each of the gear stages is governed by a gear ratio between the sun gear and the ring gear in each of the planetary gear sets 43, 44, 45, and 46.

Turning to FIG. 4, there is shown a temporal change in an input torque to an input shaft of the transmission when motoring the engine, and temporal changes in torques applied to engagement devices to be engaged to establish the 8th stage as the target stage. In the case of establishing the 8th stage, the engagement pressure is applied to the engagement devices from the first brake B1, the fourth clutch C4, and the third clutch C3 in order. Order of applying the engagement pressure to the engagement devices differs from gear stage to gear stage.

Shifting operation of the transmission unit 15 may be executed on the principle of shifting model control based on motion equations of the rotary elements of the transmission unit 15. According to the shifting model control, an operation amount is calculated by solving the motion equation obtained based on a shifting target value, and the shifting operation of the transmission unit 15 is executed based on the calculated operation amount.

At point t0, the condition to shift the operating mode from the EV mode to the parallel HV mode is satisfied, and the operating oil is supplied to the first brake B1 to establish the 8th stage. Then, the operating oil is supplied to the fourth clutch C4 at point t1, and thereafter the operating oil is supplied to the third clutch C3 at point t2. Motoring of the first motor 17 is started at point t0, and completed at point t2.

In order to raise a pressure of the operating oil supplied to the engagement device smoothly from an initial pressure, it is preferable to supply the operating oil to the engagement device by a first-fill method in which a hydraulic command of the operating oil supplied to the engagement device is raised temporarily. However, change in the pressure of the operating oil is omitted in FIG. 4.

Figure 5:
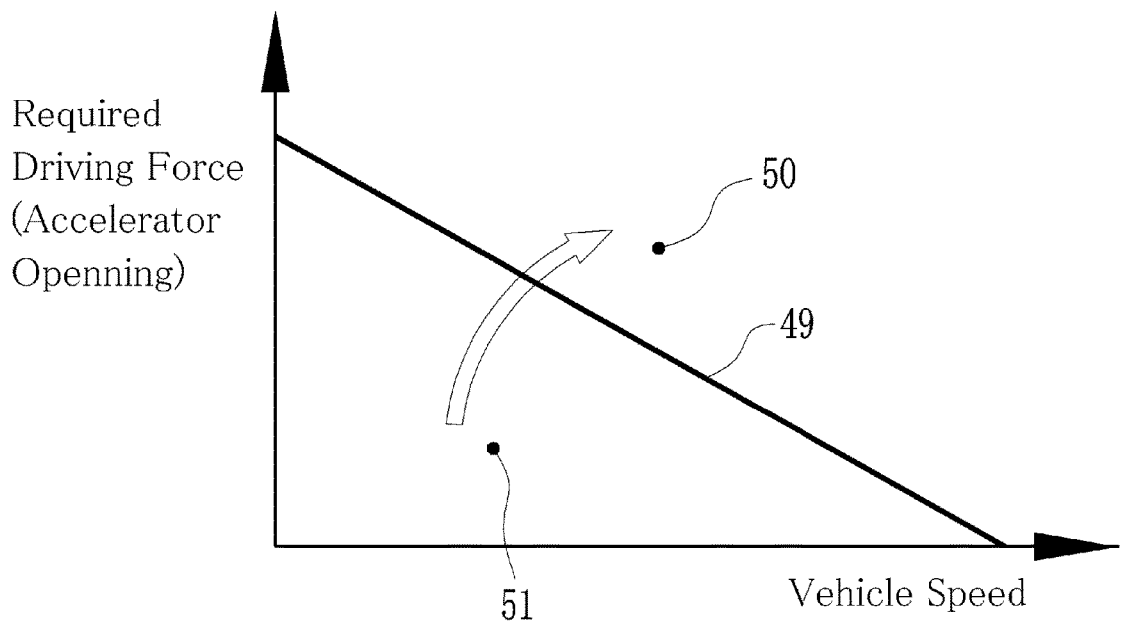
FIG. 5 is a map for determining an operating mode based on an operating point of the vehicle governed by a required driving force and a vehicle speed.

FIG. 5 shows an example of a map for determining the operating mode based on an operating point of the vehicle 10 governed by a required driving force and a vehicle speed. The map shown in FIG. 5 is installed in a storage device 48 shown in FIG. 1. Specifically, the mode selector 33 determines the operating mode of the vehicle 10 based on a location of the operating point in FIG. 5.

As shown in FIG. 5, a boundary line 49 is drawn between a parallel HV region 51 and an EV region 51. During propulsion in the EV mode, when the operating point is shifted from the EV region 51 to the parallel HV region 50 across the boundary line 49, a condition to start the engine 11 is satisfied and the operating mode is shifted to the parallel HV mode. Here, such shifting of the operating mode may also be determined based at least on one of the required driving force and the vehicle speed.

The ECU 30 further comprises a target stage determiner 36 shown in FIG. 1 that sets the target stage (i.e., a target speed ratio) of the transmission unit 15 upon satisfaction of the condition to start the engine 11. Specifically, the target stage determiner 36 determines the target stage based on a vehicle speed and a depression of the accelerator pedal with reference to a shifting map installed in the storage device 48.

The shifting time determiner 34 may determine whether the shifting operation to the target stage takes longer time than the shifting operation to other stages based on a torque of the output shaft 15b or a change amount in an angular acceleration of the input shaft 15a obtained using a motion equation of the transmission unit 15.

Examples of the motion equations of the rotary element of the transmission unit 15 are listed below. The equations (1) and (2) are the equations of a case in which the first two engagement devices are engaged to establish a gear stage.

Specifically, a torque of the output shaft 15b of the transmission unit 15 may be expressed as $$Tout = Tin \cdot A1 + Tfin \cdot B1 \quad (1)$$

where Tout is the torque of the output shaft 15b, Tin is a torque of the input shaft 15a, A1 is a first coefficient, Tfin is a final clutch torque, and B1 is a first coefficient. On the other hand, an angular acceleration of the input shaft 15a may be expressed as $$Ain = Tin \cdot A2 + Tfin \cdot B2 \quad (2)$$

where Ain is the angular acceleration of the input shaft 15a, Tin is a torque of the input shaft 15a, A2 is a second coefficient, Tfin is a final clutch torque, and B2 is a second coefficient.

Specifically, the first coefficient A1, the second coefficient A2, the first coefficient B1, and the second coefficient B2 are coefficients obtained based on an inertia of each of the engagement devices and a gear ratio of each of the planetary gear sets. Values of the first coefficient A1, the second coefficient A2, the first coefficient B1, and the second coefficient B2 differ from gear stage to gear stage.

The shifting time determiner 34 may determine the shifting time of the transmission unit 15 using the equation (2). Specifically, in order to determine the shifting time of the transmission unit 15, an angular acceleration of the input shaft 15a is calculated based on a change in a torque of the input shaft 15a during motoring of the engine 11 and a torque transmitting capacity of the last engagement device to be engaged. Then, a change in a speed of the input shaft 15a based on the calculated angular acceleration of the input shaft 15a. Thereafter, the shifting time of the transmission unit 15 is determined based on a slowdown in an increasing rate of the speed of the input shaft 15a. Specifically, the shifting time determiner 34 determines that the shifting operation to the target stage takes longer time than the shifting operation to other stages if such slowdown in the increasing rate of the speed of the input shaft 15a is expected.

Specifically, if the second coefficient A2 in the equation (2) in the case of establishing the target stage is smaller than the second coefficient A2 in the equation (2) in the case of establishing other stages, the shifting time determiner 34 determines that the shifting operation to the target stage takes longer time than the shifting operation to other stages. In this case, therefore, the gear stage determiner 35 sets the interim stage that can be established more promptly.

Figure 6:
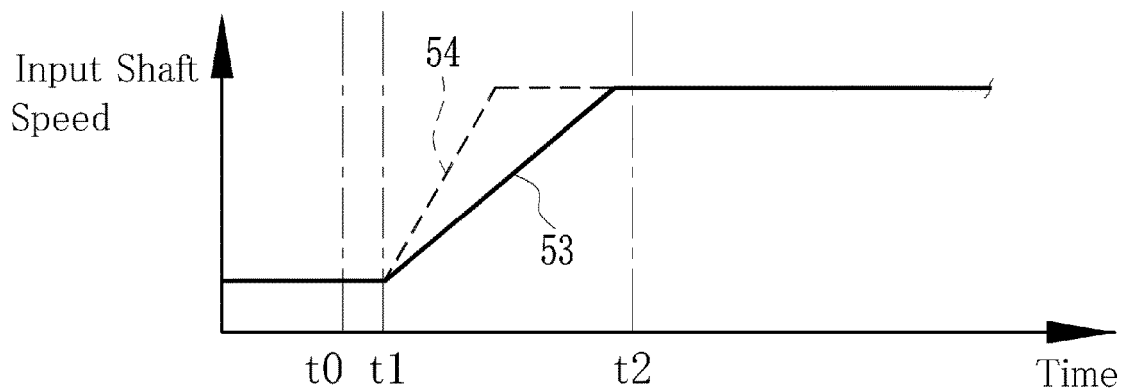
FIG. 6 is a time chart indicating a temporal change in a speed of the input shaft of the transmission corresponding to an angular acceleration of the input shaft calculated using an equation of motion.

FIG. 6 shows a temporal change in the speed of the input shaft 15a corresponding to the angular acceleration of the input shaft 15a calculated using the equation (2) in the case of establishing the target stage. In the situation shown in FIG. 6, a change rate 53 of the speed of the input shaft 15a per unit of time calculated using the equation (2) is slower or milder than a predetermined change rate 54.

At point t0, the condition to start the engine 11 is satisfied, and the operating oil is applied to the first engagement device to be engaged. Then, at point t1, the operating oil is supplied to the second engagement device to be engaged. Thereafter, at point t2, the operating oil is supplied to the third engagement device to be engaged, and the target stage is established in the transmission unit 15.

The shifting time determiner 34 may also determine the shifting time of the transmission unit 15 to establish the target stage using the equation (1). In this case, in order to determine the shifting time of the transmission unit 15, a torque of the output shaft 15b is calculated based on a change in a torque of the input shaft 15a during motoring of the engine 11 and a torque transmitting capacity of the last engagement device to be engaged. Then, it is determined whether a shock is caused by a change in a longitudinal acceleration of the vehicle 10 resulting from a change in the torque of the output shaft 15b. If such shock is expected to be caused by establishing the target stage, the operating oil has to be supplied in a mild manner to engage the engagement devices so as to reduce the shock. In this case, therefore, the shifting time determiner 34 determines that the shifting operation to the target stage takes longer time than the shifting operation to other stages.

Figure 7:
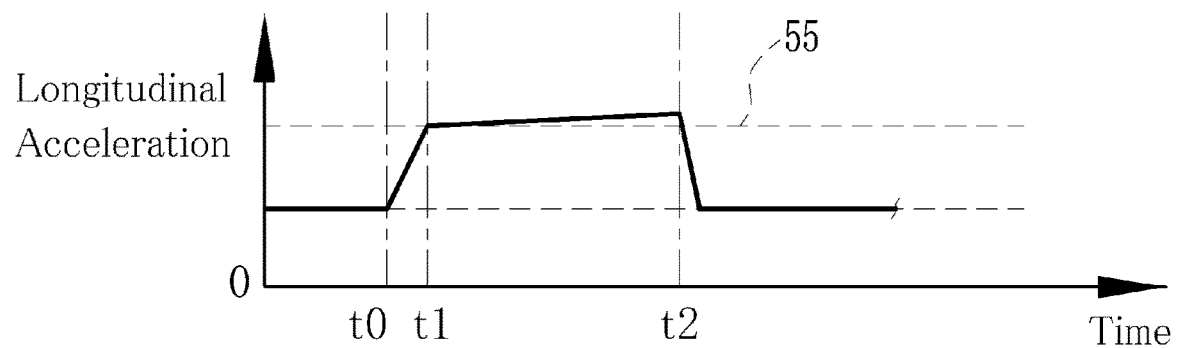
FIG. 7 is a a is a time chart indicating a temporal change in a longitudinal acceleration of the vehicle corresponding to an output shaft torque of the transmission calculated using an equation of motion.

FIG. 7 shows a temporal change in the longitudinal acceleration of the vehicle 10 corresponding to torque of the output shaft 15b calculated using the equation (1) in the case of establishing the target stage. In the situation shown in FIG. 7, the longitudinal acceleration of the vehicle 10 exceeds a uniform motion line 55 from point t1 to point t2. That is, shock is caused between point t1 and point t2.

At point t0, the condition to start the engine 11 is satisfied, and the operating oil is applied to the first engagement device to be engaged. Then, at point t1, the operating oil is supplied to the second engagement device to be engaged. Thereafter, at point t2, the operating oil is supplied to the third engagement device to be engaged.

If the first coefficient A1 in the equation (1) of the case of establishing the target stage is greater than the first coefficient A1 in the equation (1) of the case of establishing other stages, an input speed to the engagement device is raised higher than an output speed from the engagement device by a change in an inertia torque resulting from changes in speeds of the engine 11 and rotary members of the transmission unit 15. Consequently, the above-mentioned shock is caused. In this case, it is necessary to raise the hydraulic pressure applied to the last engagement device to be engaged in a mild manner, therefore, the shifting time determiner 34 determines that the shifting operation to the target stage takes longer time than the shifting operation to other stages.

The shifting time determiner 34 executes the above-explained determination of the shifting time of the transmission unit 15 using the equations (1) and (2) every time the condition to start the engine 11 is satisfied, and calculation results in each gear stage are stored in the storage device 48. That is, the above-explained determination of the shifting time of the transmission unit 15 may be made based on data stored in the storage device 48.

Figure 8:
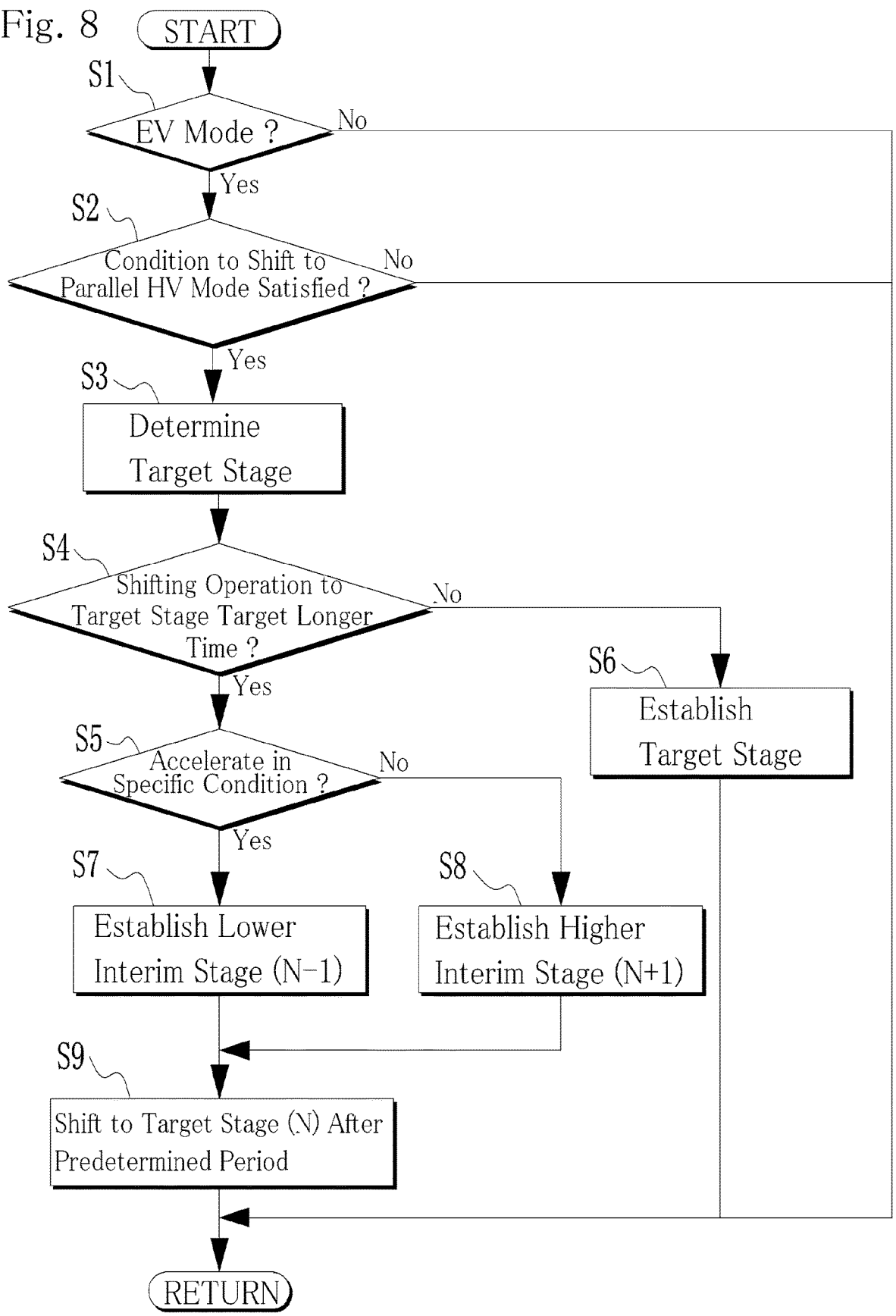
FIG. 8 is a flowchart showing a routine executed to shift an operating mode from an electric vehicle mode to a parallel mode.

Turning to FIG. 8, there is shown a routine executed when shifting the operating mode of the vehicle 10 from the EV mode to the parallel HV mode. At step S1, it is determined whether the vehicle 10 is currently propelled in the EV mode. If the vehicle 10 is not propelled in the EV mode so that the answer of step S1 is NO, the routine returns.

By contrast, if the vehicle 10 is currently propelled in the EV mode so that the answer of step S1 is YES, the routine progresses to step S2 to determine whether the condition to shift the operating mode to the parallel HV mode is satisfied. In other words, it is determined whether the condition to start the engine 11 is satisfied. If the condition to shift the operating mode to the parallel HV mode has not yet been satisfied so that the answer of step S2 is NO, the routine returns.

By contrast, if the condition to shift the operating mode to the parallel HV mode has been satisfied e.g., by depressing the accelerator pedal so that the answer of step S2 is YES, the routine progresses to step S3 to determine the target stage (N) by the target stage determiner 36 based on the current operating condition of the vehicle 10.

Then, at step S4, it is determined whether a shifting operation of the transmission unit 15 to directly establish the target stage takes longer time than a shifting operation of the transmission unit 15 to establish the target stage via other stage. As described, such determination is made by the shifting time determiner 34 using the above-explained equations (1) and (2).

As described, if a shock is expected to be caused by establishing the target stage, the operating oil has to be supplied in a mild manner to the engagement devices so as to reduce the shock. In this case, therefore, the shifting operation to establish the target stage takes longer time. Likewise, if the change rate of the speed of the input shaft 15a per unit of time when establishing the target stage is expected to be slower than the predetermined change rate, the shifting operation to the target stage also takes longer time.

For example, in a case that the target stage is set to the 8th stage, a torque of the output shaft 15b of the transmission unit 15 may be expressed as:

$$Tout = Tin \cdot A1\_8th + Tfin \cdot B1\_8th \qquad (3)$$

where Tout is the torque of the output shaft 15b, Tin is a torque of the input shaft 15a, A1_8th is a first coefficient employed when establishing the 8th stage, Tfin is a final clutch torque, and B1_8th is a first coefficient employed when establishing the 8th stage.

On the other hand, an angular acceleration of the input shaft 15a may be expressed as:

$$Ain = Tin \cdot A2\_8th + Tfin \cdot B2\_8th \qquad (4)$$

where Ain is the angular acceleration of the input shaft 15a, Tin is a torque of the input shaft 15a, A2_8th is a second coefficient employed when establishing the 8th stage, Tfin is a final clutch torque, and B2_8th is a second coefficient employed when establishing the 8th stage.

A torque of the output shaft 15b of the transmission unit 15 in a case of establishing the 7th stage as the lower interim stage may be expressed as:

$$Tout = Tin \cdot A1\_7th + Tfin \cdot B1\_7th \qquad (5)$$

where Tout is the torque of the output shaft 15b, Tin is a torque of the input shaft 15a, A1_7th is a first coefficient employed when establishing the 7th stage, Tfin is a final clutch torque, and B1_7th is a first coefficient employed when establishing the 7th stage.

On the other hand, an angular acceleration of the input shaft 15a in a case of establishing the 7th stage may be expressed as:

$$Ain = Tin \cdot A2\_7th + Tfin \cdot B2\_7th \qquad (6)$$

where Ain is the angular acceleration of the input shaft 15a, Tin is a torque of the input shaft 15a, A2_7th is a second coefficient employed when establishing the 7th stage, Tfin is a final clutch torque, and B2_7th is a second coefficient employed when establishing the 7th stage.

In turn, a torque of the output shaft 15b of the transmission unit 15 in a case of establishing the 9th stage as the higher interim stage may be expressed as:

$$Tout = Tin \cdot A1\_9th + Tfin \cdot B1\_9th \quad (7)$$

where Tout is the torque of the output shaft 15b, Tin is a torque of the input shaft 15a, A1_9th is a first coefficient employed when establishing the 9th stage, Tfin is a final clutch torque, and B1_9th is a first coefficient employed when establishing the 9th stage.

On the other hand, an angular acceleration of the input shaft 15a in a case of establishing the 9th stage may be expressed as:

$$Ain = Tin \cdot A2\_9th + Tfin \cdot B2\_9th \quad (8)$$

where Ain is the angular acceleration of the input shaft 15a, Tin is a torque of the input shaft 15a, A2_9th is a second coefficient employed when establishing the 9th stage, Tfin is a final clutch torque, and B2_9th is a second coefficient employed when establishing the 9th stage.

At step S4, specifically, the shifting time determiner 34 determines that it is possible to establish the interim stage with a less shock and in shorter period of time in comparison with a case of establishing the target stage, if both of the below-listed first condition and second condition are satisfied.

[First Condition]

$$\frac{A1\_7th}{A1\_9th} \ll A1\_8th$$

[Second Condition]

$$\frac{A2\_7th}{A2\_9th} \gg A2\_8th$$

Thus, the first condition is satisfied if the first coefficient A1_8th employed when establishing the 8th stage is significantly greater than the first coefficient A1_7th employed when establishing the 7th stage and the first coefficient A1_9th employed when establishing the 9th stage. That is, the first condition is satisfied if the torque of the output shaft 15b in the case of establishing the target stage is significantly greater than those in the cases of establishing the lower interim stage and the higher interim stage. In a case that the first condition is satisfied, a shock will be caused by establishing the target stage.

On the other hand, the second condition is satisfied if the second coefficient A2_8th employed when establishing the 8th stage is significantly smaller than the second coefficient A2_7th employed when establishing the 7th stage and the second coefficient A2_9th employed when establishing the 9th stage. That is, the second condition is satisfied if the angular acceleration of the input shaft 15a, in the case of establishing the target stage is significantly smaller than those in the cases of establishing the lower interim stage and the higher interim stage. In a case that the second condition is satisfied, an acceleration response will be reduced by establishing the target stage.

If the shifting operation of the transmission unit 15 to directly establish the target stage does not take longer time than the shifting operation of the transmission unit 15 to establish the target stage via other stage so that the answer of step S4 is NO, the routine progresses to step S6 to directly establish the target stage (N) in the transmission unit 15.

By contrast, if the shifting operation of the transmission unit 15 to directly establish the target stage takes longer time than the shifting operation of the transmission unit 15 to establish the target stage via other stage so that the answer of step S4 is YES, the routine progresses to step S5 to determine whether the engine 11 is required to be started to accelerate the vehicle 10 in the above-mentioned specific condition.

If the engine 11 is required to be started to accelerate the vehicle 10 in the above-mentioned specific condition so that the answer of step S5 is YES, the routine progresses to step S7 to establish the interim stage one stage lower than the target stage (N−1).

By contrast, if the engine 11 is required to be started but not to accelerate the vehicle 10 in the above-mentioned specific condition so that the answer of step S5 is NO, the routine progresses to step S8 to establish the interim stage one stage higher than the target stage (N+1).

After establishing the interim stage at step S7 or S8, the routine progresses to step S9 to shift the gear stage from the interim stage to the target stage after the lapse of predetermined period of time. Thereafter, the routine returns.

Figure 9:
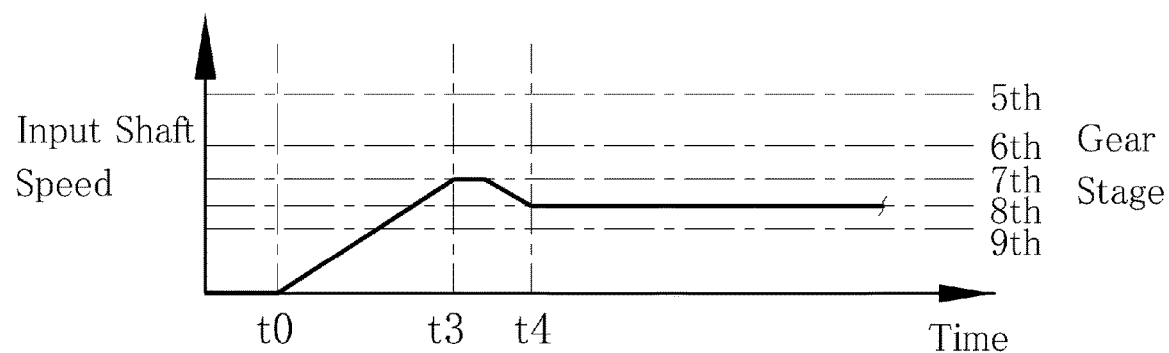
FIG. 9 is a time chart indicating a temporal change in a speed of the input shaft when shifting a gear stage to a target stage via a lower stage.

FIG. 9 shows a temporal change in the speed of the input shaft 15a when establishing the target stage via the lower interim stage at step S7. At point t0, the condition to start the engine 11 is satisfied. After the lapse of a predetermined period of time, the 7th stage as the lower interim stage is established at point t3, and thereafter the 8th stage as the target stage is established at point t4. As can be seen from FIG. 3, the gear stage can be shifted promptly from the 7th stage to the 8th stage by merely disengaging the first clutch C1 while engaging the first brake B1. If the acceleration of the vehicle 10 in a specific condition at point t4, the gear stage of the transmission unit 15 may be maintained to the 7th stage to accelerate the vehicle 10 smoothly.

Figure 10:
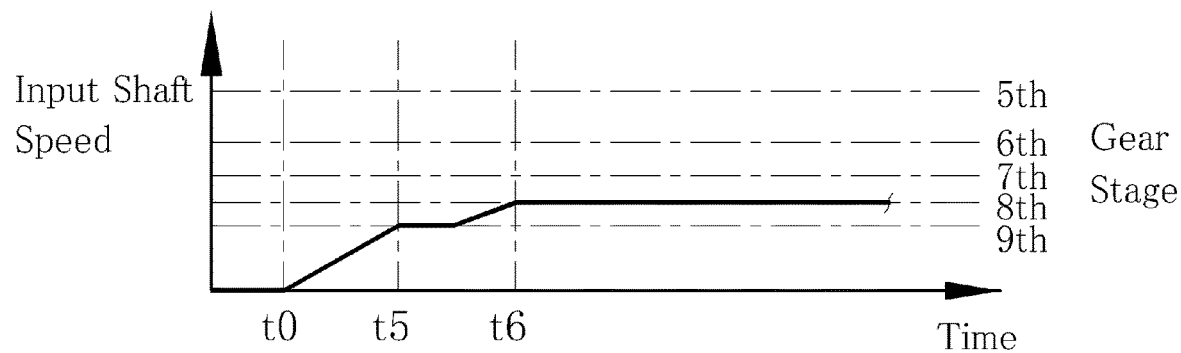
FIG. 10 is a time chart indicating a temporal change in a speed of the input shaft when shifting a gear stage to a target stage via a higher stage.

FIG. 10 shows a temporal change in the speed of the input shaft 15a when establishing the target stage via the higher interim stage at step S8. At point t0, the condition to start the engine 11 is satisfied. After the lapse of a predetermined period of time, the 9th stage as the higher interim stage is established at point t3, and thereafter the 8th stage as the target stage is established at point t4. As can be seen from FIG. 3, the gear stage can be shifted promptly from the 9th stage to the 8th stage by merely disengaging the first clutch C1 while engaging the fourth clutch C4. In this case, engine noise can be reduced during the shifting operation of the gear stage.

Although the above exemplary embodiments of the present application have been described, it will be understood by those skilled in the art that the present application should not be limited to the described exemplary embodiments, and various changes and modifications can be made within the spirit and scope of the present application.

For example, the control system according to the embodiment of the present disclosure may also be applied to a vehicle without having the first motor 1 that is powered by the engine 11 in the engine mode and by the second motor 26 in the EV mode. In addition, the control system may also be applied to a rear wheel drive layout vehicle without having the transfer 25. Further, the control system may also be applied to a vehicle without having the first motor 17 and the second motor 26 but having the engine 11 and the transmission unit 15.

Moreover, number of the gear stage of the transmission unit 15 may be changed arbitrarily. In addition, a transmission unit in which a gear stage is established by manipulating two engagement devices may also be employed instead of the transmission unit 15.

Furthermore, the interim stage may also be set to a gear stage two stages lower or higher than the target stage.

What is claimed is:

1. A vehicle control system, comprising:
    an engine that generates a driving force to propel a vehicle;
    a transmission that changes the driving force and outputs the changed driving force; and
    a controller that controls the engine and the transmission;
    wherein the controller is configured to determine a satisfaction of a condition to start the engine during propulsion while the engine is stopped,
    set a target stage to be established by the transmission upon satisfaction of the condition to start the engine,
    determine whether a shifting operation of the transmission, to directly establish the target stage, takes a longer amount of time than a shifting operation of the transmission to establish the target stage via other stage,
    set an interim stage that can be established by the transmission in a shorter period of time than the target stage, and shift a gear stage from the interim stage to the target stage, in a case that the shifting operation of the transmission to directly establish the target stage is expected to take a longer amount of time than the shifting operation of the transmission to establish the target stage via the other stage, and
    establish the target stage directly in a case that the shifting operation of the transmission to directly establish the target stage is expected not to take a longer amount of time than the shifting operation of the transmission to establish the target stage via the other stage.

2. The vehicle control system as claimed in claim 1, wherein the controller is further configured to determine that the shifting operation of the transmission to directly establish the target stage takes a longer amount of time than the shifting operation of the transmission to establish the target stage via other stage, if an amount of change in an angular acceleration of an input shaft of the transmission to be caused by directly establishing the target stage is smaller than a threshold value.

3. The vehicle control system as claimed in claim 2, wherein the controller is further configured to set the interim stage to a gear stage one stage lower than the target stage or one stage higher than the target stage.

4. The vehicle control system as claimed in claim 3, wherein the controller is further configured to set the interim stage to the gear stage one stage lower than the target stage if the engine is required to be started to accelerate the vehicle in a specific condition.

5. The vehicle control system as claimed in claim 4, further comprising:
    a first motor that is connected to the engine; and
    a second motor that applies a driving force to a wheel,
    wherein the transmission comprises a plurality of engagement devices,
    the gear stage is established in the transmission by engaging any two or more engagement devices,
    the transmission is brought into a neutral stage to interrupt power transmission by disengaging the engagement devices,
    an operating mode of the vehicle is selected from an electric vehicle mode in which the engagement devices are disengaged and the vehicle is powered by the second motor while stopping the engine, and a parallel hybrid vehicle mode in which the vehicle is powered by the engine in a predetermined gear stage, and
    the controller is further configured to start the engine by the first motor upon satisfaction of a condition to shift the operating mode from the electric vehicle mode to the parallel hybrid vehicle mode.

6. The vehicle control system as claimed in claim 3, further comprising:
    a first motor that is connected to the engine; and
    a second motor that applies a driving force to a wheel,
    wherein the transmission comprises a plurality of engagement devices,
    the gear stage is established in the transmission by engaging any two or more engagement devices,
    the transmission is brought into a neutral stage to interrupt power transmission by disengaging the engagement devices,
    an operating mode of the vehicle is selected from an electric vehicle mode in which the engagement devices are disengaged and the vehicle is powered by the second motor while stopping the engine, and a parallel hybrid vehicle mode in which the vehicle is powered by the engine in a predetermined gear stage, and
    the controller is further configured to start the engine by the first motor upon satisfaction of a condition to shift the operating mode from the electric vehicle mode to the parallel hybrid vehicle mode.

7. The vehicle control system as claimed in claim 2, further comprising:
    a first motor that is connected to the engine; and
    a second motor that applies a driving force to a wheel,
    wherein the transmission comprises a plurality of engagement devices,
    the gear stage is established in the transmission by engaging any two or more engagement devices,
    the transmission is brought into a neutral stage to interrupt power transmission by disengaging the engagement devices,
    an operating mode of the vehicle is selected from an electric vehicle mode in which the engagement devices are disengaged and the vehicle is powered by the second motor while stopping the engine, and a parallel hybrid vehicle mode in which the vehicle is powered by the engine in a predetermined gear stage, and
    the controller is further configured to start the engine by the first motor upon satisfaction of a condition to shift the operating mode from the electric vehicle mode to the parallel hybrid vehicle mode.

8. The vehicle control system as claimed in claim 1, wherein the controller is further configured to determine that the shifting operation of the transmission to directly establish the target stage takes a longer amount of time than the shifting operation of the transmission to establish the target stage via other stage, if an amount of change in a torque of an output shaft of the transmission to be caused by directly establishing the target stage is greater than a threshold value.

9. The vehicle control system as claimed in claim 8, wherein the controller is further configured to set the interim stage to a gear stage one stage lower than the target stage or one stage higher than the target stage.

10. The vehicle control system as claimed in claim 9, further comprising:
a first motor that is connected to the engine; and
a second motor that applies a driving force to a wheel,
wherein the transmission comprises a plurality of engagement devices,
the gear stage is established in the transmission by engaging any two or more engagement devices,
the transmission is brought into a neutral stage to interrupt power transmission by disengaging the engagement devices,
an operating mode of the vehicle is selected from an electric vehicle mode in which the engagement devices are disengaged and the vehicle is powered by the second motor while stopping the engine, and a parallel hybrid vehicle mode in which the vehicle is powered by the engine in a predetermined gear stage, and
the controller is further configured to start the engine by the first motor upon satisfaction of a condition to shift the operating mode from the electric vehicle mode to the parallel hybrid vehicle mode.

11. The vehicle control system as claimed in claim 8, further comprising:
a first motor that is connected to the engine; and
a second motor that applies a driving force to a wheel,
wherein the transmission comprises a plurality of engagement devices,
the gear stage is established in the transmission by engaging any two or more engagement devices,
the transmission is brought into a neutral stage to interrupt power transmission by disengaging the engagement devices,
an operating mode of the vehicle is selected from an electric vehicle mode in which the engagement devices are disengaged and the vehicle is powered by the second motor while stopping the engine, and a parallel hybrid vehicle mode in which the vehicle is powered by the engine in a predetermined gear stage, and
the controller is further configured to start the engine by the first motor upon satisfaction of a condition to shift the operating mode from the electric vehicle mode to the parallel hybrid vehicle mode.

12. The vehicle control system as claimed in claim 1, wherein the controller is further configured to set the interim stage to a gear stage one stage lower than the target stage or one stage higher than the target stage.

13. The vehicle control system as claimed in claim 12, further comprising:
a first motor that is connected to the engine; and
a second motor that applies a driving force to a wheel,
wherein the transmission comprises a plurality of engagement devices,
the gear stage is established in the transmission by engaging any two or more engagement devices,
the transmission is brought into a neutral stage to interrupt power transmission by disengaging the engagement devices,
an operating mode of the vehicle is selected from an electric vehicle mode in which the engagement devices are disengaged and the vehicle is powered by the second motor while stopping the engine, and a parallel hybrid vehicle mode in which the vehicle is powered by the engine in a predetermined gear stage, and
the controller is further configured to start the engine by the first motor upon satisfaction of a condition to shift the operating mode from the electric vehicle mode to the parallel hybrid vehicle mode.

14. The vehicle control system as claimed in claim 1, further comprising:
a first motor that is connected to the engine; and
a second motor that applies a driving force to a wheel,
wherein the transmission comprises a plurality of engagement devices,
the gear stage is established in the transmission by engaging any two or more engagement devices,
the transmission is brought into a neutral stage to interrupt power transmission by disengaging the engagement devices,
an operating mode of the vehicle is selected from an electric vehicle mode in which the engagement devices are disengaged and the vehicle is powered by the second motor while stopping the engine, and a parallel hybrid vehicle mode in which the vehicle is powered by the engine in a predetermined gear stage, and
the controller is further configured to start the engine by the first motor upon satisfaction of a condition to shift the operating mode from the electric vehicle mode to the parallel hybrid vehicle mode.

* * * * *